US008070449B2

(12) United States Patent
Urban et al.

(10) Patent No.: US 8,070,449 B2
(45) Date of Patent: Dec. 6, 2011

(54) WIND TURBINE

(75) Inventors: Roy H. Urban, Wheeling, IL (US); Robert Lewandowski, Two Rivers, WI (US)

(73) Assignee: Absolute Turn, Inc., Wheeling, IL (US)

( * ) Notice: Subject to any disclaimer, the term of this patent is extended or adjusted under 35 U.S.C. 154(b) by 405 days.

(21) Appl. No.: 12/432,083

(22) Filed: Apr. 29, 2009

(65) Prior Publication Data

US 2009/0269209 A1  Oct. 29, 2009

Related U.S. Application Data

(60) Provisional application No. 61/125,865, filed on Apr. 29, 2008.

(51) Int. Cl.
*F01D 5/08* (2006.01)

(52) U.S. Cl. ............... 416/223 R; 416/140; 416/145; 416/197 A; 415/147; 415/148

(58) Field of Classification Search ............ 415/4.4, 415/4.2, 147, 148, 208, 907; 416/140, 145, 416/197 A, 223 R
See application file for complete search history.

(56) References Cited

U.S. PATENT DOCUMENTS

| | | |
|---|---|---|
| 1,467,699 A | 9/1923 | Vinding et al. |
| 1,697,574 A | 1/1929 | Savonius |
| 2,501,442 A | 3/1950 | Donaldson |
| 2,768,803 A | 10/1956 | Smith |
| 3,079,115 A | 2/1963 | Edwards, Jr. et al. |
| 3,997,136 A | 12/1976 | Finn et al. |
| 4,012,017 A | 3/1977 | Springston et al. |
| 4,051,622 A | 10/1977 | Sharp |
| 4,132,499 A | 1/1979 | Igra |
| 4,177,014 A * | 12/1979 | Kephart, Jr. ............... 416/197 A |
| 4,264,279 A | 4/1981 | Dereng |
| 4,293,274 A | 10/1981 | Gilman |
| 4,366,386 A | 12/1982 | Hanson |
| 4,602,584 A | 7/1986 | North et al. |
| 4,715,776 A | 12/1987 | Benesh |
| 5,096,378 A | 3/1992 | Jamieson |
| 5,320,491 A | 6/1994 | Coleman et al. |
| 6,015,258 A | 1/2000 | Taylor |
| 6,966,747 B2 | 11/2005 | Taylor et al. |
| 7,189,050 B2 | 3/2007 | Taylor et al. |
| 7,347,660 B2 | 3/2008 | Taylor et al. |
| 7,874,787 B2 * | 1/2011 | Morris ............ 415/4.2 |
| 2003/0025335 A1 * | 2/2003 | Elder ............... 290/55 |
| 2004/0022635 A1 | 2/2004 | Vanmoor |
| 2005/0025624 A1 | 2/2005 | Pierson |
| 2006/0153682 A1 * | 7/2006 | Vanderhye et al. ....... 416/197 A |
| 2006/0257240 A1 * | 11/2006 | Naskali et al. ............. 415/4.4 |
| 2007/0104582 A1 | 5/2007 | Rahai et al. |
| 2007/0267874 A1 | 11/2007 | Taylor et al. |
| 2008/0304968 A1 * | 12/2008 | Fite ............... 416/140 |
| 2010/0196144 A1 * | 8/2010 | Morris ............ 415/147 |
| 2010/0254799 A1 * | 10/2010 | Caines ............ 415/36 |
| 2011/0033288 A1 * | 2/2011 | Pezaris ............ 415/208.1 |
| 2011/0164977 A1 * | 7/2011 | Vallejo ............ 416/145 |

* cited by examiner

*Primary Examiner* — Michael Lebentritt
(74) *Attorney, Agent, or Firm* — Bishop & Diehl, Ltd.

(57) ABSTRACT

A vertical-axis wind turbine for use with an electrical generator for producing power by converting the energy of wind currents into mechanical rotational energy which is then used to operate the electrical generator. In an embodiment, a rotor is responsive to wind currents by imparting rotation upon a central vertical shaft. Preferably, the rotor is designed with functional curved surfaces for efficient operation.

20 Claims, 2 Drawing Sheets

WIND TURBINE

CROSS-REFERENCE TO RELATED APPLICATIONS

This application claims the benefit of Provisional Patent Application Ser. No. 61/125,865, filed Apr. 29, 2008.

TECHNICAL FIELD OF THE INVENTION

The present invention relates to wind turbines, and more specifically to a vertical-axis wind turbine used to convert wind energy into mechanical energy, and still more particularly to the incorporation of a novel turbine blade in a vertical-axis wind turbine.

BACKGROUND OF THE INVENTION

Wind as a source of energy is a concept that has been promoted for some time. According to one source, there is evidence which shows that windmills were in use in Babylon and in China as early as 2000 B.C. The U.S. Patent and Trademark Office has granted patents on windmill devices dating back to the early to mid 1800's.

Generally, in the art, wind turbines have either a vertical or horizontal axis. Typically, most or all of commercial wind turbines today are built with a propeller-type rotor on a horizontal axis (i.e., a horizontal main shaft) in order that they may face directly into a wind. It is generally known that most horizontal axis turbines built today are two or three-bladed, although some have fewer or more blades. The purpose of the rotor is to convert the linear motion of the wind into rotational energy that can be used to drive a generator.

Worldwide interest in renewable energy options, however, has given rise to a significant increase in new wind turbine designs. Some of the most recent models on the market, therefore, are vertical axis wind turbines ("VAWTs"). Vertical-axis wind turbines are typically of a long axis type, allowing large columns of air to be harnessed.

There exist two main types of VAWTs—the Savonius turbine which is a high speed, low torque turbine and the Darrieus turbine, which is a low speed, high torque turbine. Generally, the Darrieus turbine resembles an egg beater, where two vertically oriented blades revolve around a vertical shaft. Generally, the Darrieus models use an airfoil design so that a wind turbine airfoil essentially works in the same way as an airplane wing so that an airfoil has a flat side and a curved side. The result of air passing over the two sides is a force known as "lift." When an airplane speeds down a runway, air passing on both sides of the airfoil wings, the lift force literally lifts the airplane into the air. This will continue as long as there is forward motion over the airfoil to generate the required lift.

SUMMARY OF THE INVENTION

A system and method is provided for conversion of wind energy into rotational mechanical energy. In an embodiment, a wind turbine system is provided comprising a base, with the base standing in a substantially vertical orientation in relation to a foundation or the ground and having a bottom plate and a top plate, a frame fixedly extending in a substantially vertical orientation, a power train mounted to the frame; an electrical generator attached below the power train; at least one rotor shaft rotably mounted to the frame extending in a substantially vertical orientation, a rotor blade assembly attached to the tube comprising an outer skin defining a blade surface having a leading edge and a trailing edge with a cord extending from the leading edge to the trailing edge, each side of the blade surface having a convex portion and a concave portion wherein the concave portion of one of the sides crosses the cord at a single occurrence, wherein the frame is attached to the rotor shaft so that the rotor rotates, with the blade, about the longitudinal axis of the rotor to catch the wind and use the power of the wind to optimally rotate about the vertical axis, and provide a greater efficiency than known wind turbine blades currently in use in converting the wind energy into mechanical energy.

In yet another embodiment, the outer perimeter of the rotor blade is uniform in lateral cross section and includes a rounded leading edge and a pointed trailing edge. Extending between the leading edge and the trailing edge is a first side surface and a second side surface. The first side surface is concave proximate the front edge and convex proximate the trailing edge. Conversely, the second side surface is convex proximate the front edge and concave proximate the trailing edge. In an embodiment, the first surface does not cross the cord of the rotor blade. In contrast, the second surface crosses the cord at a single occurrence.

Other embodiments, systems, methods, features, and advantages of the present invention will be, or will become, apparent to one having ordinary skill in the art upon examination of the following drawings and detailed description. It is intended that all such additional systems, method, features, and advantages be within the scope of the present invention, and can be protected by the accompanying claims.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION OF THE INVENTION

The following descriptions of detailed embodiments are for exemplifying the principles and advantages of the inventions. They are not to be taken in any way as limitations on the scope of the inventions.

Figure 1:
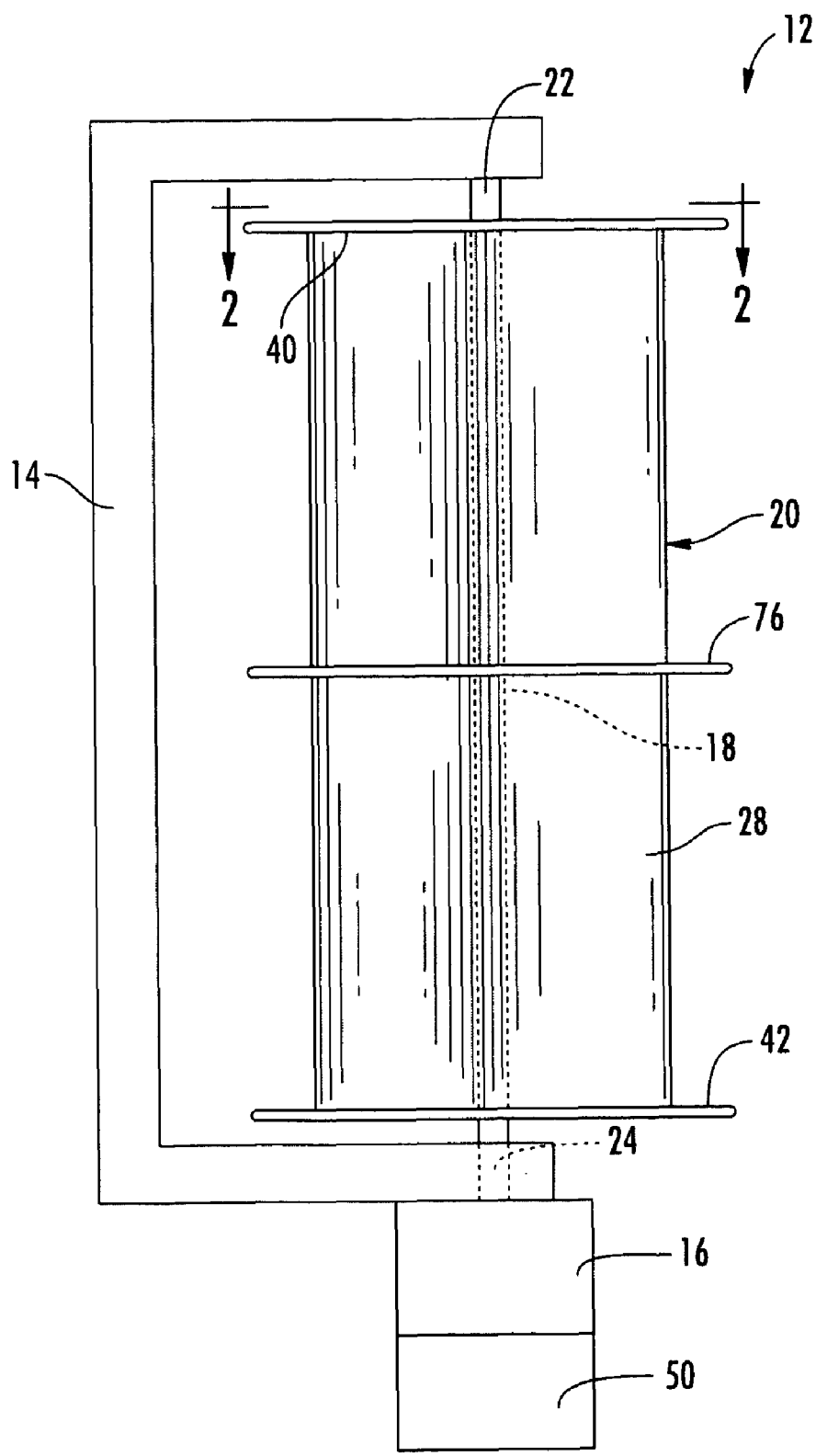
FIG. 1 is a simplified side elevation view of a wind turbine system in accordance with the present invention; and, FIG. 2 is a simplified view of the wind turbine system from plane 2-2 of FIG. 1.

In one application of an embodiment in accordance with the present invention, a wind turbine is provided for converting wind energy into mechanical energy. Turning to FIG. 1, a simplified side elevation view is provided of a system in accordance with the present invention.

The system 12 includes a support structure or frame 14 with a power train 16 mounted to the frame. A tubular rotor shaft 18 is rotatably mounted to the frame 14 and is coupled to the power train 16. Secured to the rotor shaft 18 is a wing or blade 20 that extends vertically upwardly from the power train 16.

In an embodiment, the frame 14 is generally U-shaped and can be constructed of a metal or metal alloy. Preferably, the frame 14 is fixedly mounted or anchored so that it does not move about. In an embodiment, but not necessarily, the frame can be attached to a support structure (not shown) that is mounted to a concrete pad or the like. In an alternative embodiment, the frame 14 can be attached to a preexisting freestanding tower, rooftop, or other suitable structure.

The rotor shaft 18 can be a hollow metal or metal alloy tube that is secured to the frame 14 through an upper bearing assembly at the top 22 of the rotor and through a lower bearing assembly near the bottom 24 of the rotor shaft. The rotor shaft 18 can be a single piece or may comprise a plurality of tube sections attached together.

In another embodiment, the rotor shaft 18 can be two separate shafts in coaxial alignment with each other wherein one shaft is mounted to one end of the blade 20 and/or end plate 40 and the other shaft is mounted on the opposite end of the blade and/or end plate 44.

Figure 2:
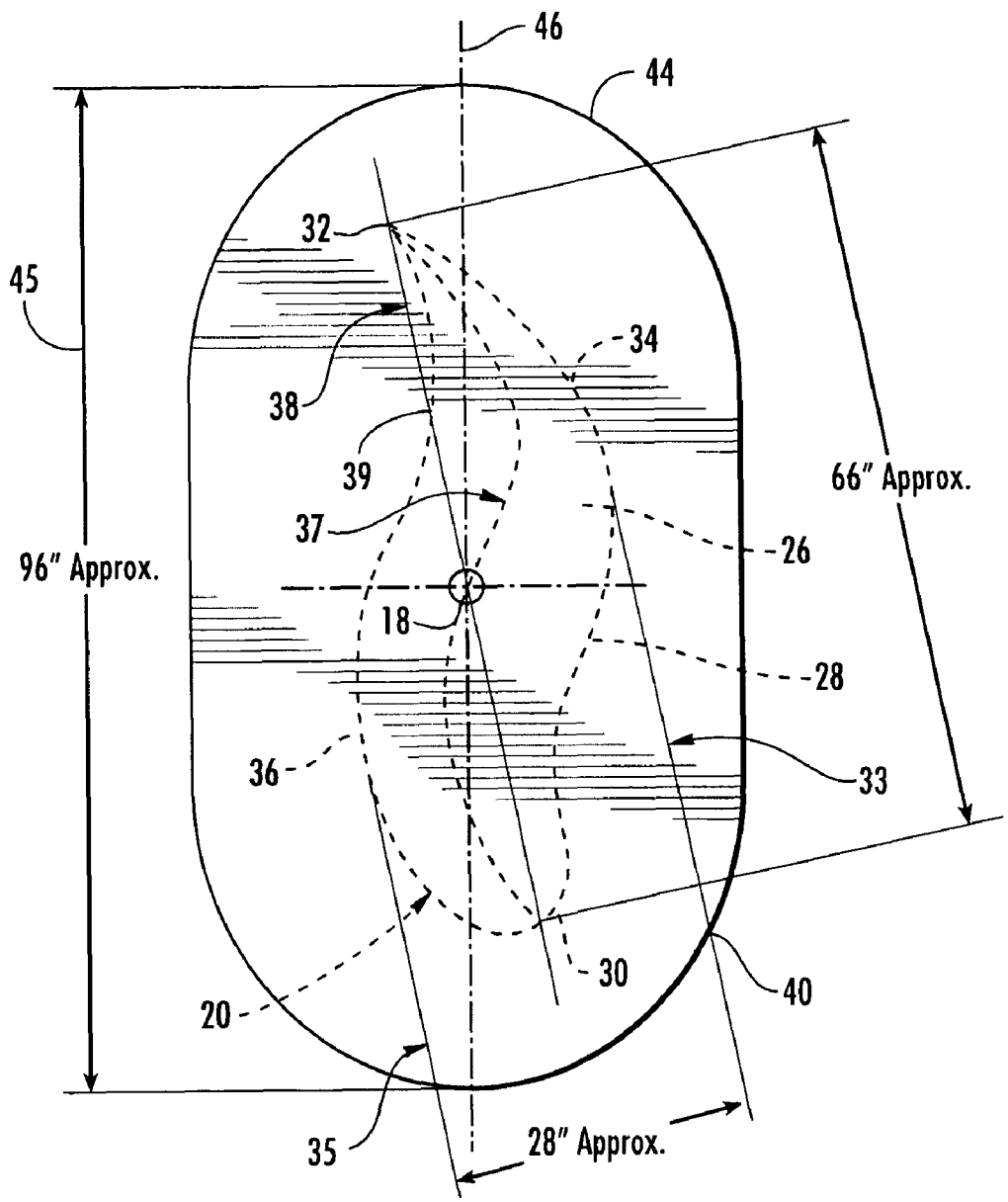

As shown in FIG. 2, the rotor blade 20 can include an inner frame 26 surrounded by an outer skin 28 to define a blade-like structure. The frame 26 is attached to the rotor 18 so that the rotor rotates, with the blade, about the longitudinal axis of the rotor. The frame 26 can be constructed of any suitable material such as plastic, fiberglass, metal, a metal alloy, wood, a fill material such as, but not limited to, polyurethane foam, or any combination thereof. In an embodiment, the frame can be constructed in a manner similar to an aircraft wing wherein the rotor shaft 18 is the spar of the blade 20 and ribs perpendicularly extend from the spar.

The outer skin 28 of the rotor blade 20 can be constructed of any suitable material such as plastic, carbon-fiber, fiberglass, metal, a metal alloy, wood, or any combination thereof. In an embodiment, the outer skin 28 and the frame 26 are a metal alloy, such as an aluminum alloy, wherein the outer skin 28 is attached to the frame 26 by rivets.

As shown in FIG. 2, in an embodiment, the outer perimeter of the rotor blade 20 is uniform in lateral cross section and includes a rounded leading edge 30 and a pointed trailing edge 32. Extending between the leading edge 30 and the trailing edge 32 is a first side surface 34 and a second side surface 36. The first side surface 34 is concave proximate the front edge 30 and convex proximate the trailing edge 32. Conversely, the second side surface 36 is convex proximate the front edge 30 and concave proximate the trailing edge 32. In an embodiment, the first surface 34 does not cross the cord 38 of the rotor blade 20. In contrast, the second surface 36 crosses the cord at a single occurrence 39.

As also shown in FIG. 2, in an embodiment, the cord 38 of the rotor blade 20 is about 66 inches long from the leading edge 30 to the trailing edge 32.

As also shown in FIG. 2, the blade 20 has an upper camber 33 and a lower camber 35, with a maximum separation between the cambers of about 28 inches. Furthermore, the blade has a mean camber line 37 that is generally S-shaped. The mean camber line 37, as illustrated in FIG. 2, is the line that is equidistant at all points between the upper 33 and lower 35 cambers of the blade 20.

Turning back to FIG. 1, as indicated previously, end plates 40 and 42 are mounted on the ends of the rotor blade 20. In an embodiment, each end plate has a cord 45 of about 96 inches that is offset from the cord 38 of the rotor blade 20. The end plates can be constructed of plastic, fiberglass, metal, a metal alloy or another suitable material. The end plates can be attached to the blade assembly in a conventional manner such as by screws, bolt, rivets or by other suitable means.

Preferably, the end plates 40 and 42 are in coplanar spaced relationship to each other and are symmetrical in shape relative to each other. As shown in FIG. 2, the outer perimeter 44 of each end plate is symmetrical about a longitudinal axis 46 and a lateral axis 48. In an embodiment, the sides of each end plate are parallel to each other and the ends are arcuate. Moreover, the cord 38 of the rotor blade 20 is offset from the longitudinal axis 46 of each end plate.

In a further embodiment, but not necessarily, one or more center or intermediate plates 76, similar to end plates 40 and 42, can be mounted to the rotor blade 20 between the end plates 40 and 42. In this embodiment, the intermediate plate (s) can have the same outer geometry, shape and size as the end plates 40 and 42, or have a different outer geometry, shape or size.

In an embodiment, the mean camber line 37 intersects with the longitudinal axis 46 of the rotor shaft 18.

As will be appreciated by those having ordinary skill in the art, the rotor blade 20 is responsive to wind currents. In particular, the blade 20 imparts rotation upon the central vertical shaft 18 when the blade is subjected to a wind current. It is believed by the inventor that the curvilinear profile of the outer skin 28 of the blade 20, depicted in FIG. 2, provides a greater efficiency than other wind turbine blades currently in use. Stated another way, as wind passes about the surface of the rotating blade, the unique profile of the blade is more efficient in converting the wind energy into mechanical energy than other blade profiles currently in use.

Furthermore, it will be apparent to those having ordinary skill in the art that the choice of wind direction is entirely arbitrary in the present invention inasmuch as the curvilinear shape of the blade will turn irrespective of the wind direction.

In an embodiment, but not necessarily, the power train 16 includes mechanical components such as a conventional speed increaser wherein the output of the speed increaser is received by an electrical generator 50. As will be appreciated by those having ordinary skill in the art, the speed increaser is operatively attached to the rotor shaft 18 by, for example, belts and/or gears and has an output shaft wherein rotation of rotor 18 results in rotation of the output shaft at a higher rotational speed than that of the rotor 18.

In an embodiment, the electrical generator 50 is a conventional device and is operatively attached to the speed increaser output shaft by, for example, belts and/or gears and generates an electrical output in response to rotation of the output shaft of the speed increaser.

Although the blade 20 is shown in FIG. 1 to be mounted in a vertical orientation relative to the horizon, in an alternative embodiment, the system 12 can be positioned so the blade is mounted in a horizontal orientation (i.e., the rotor shaft is parallel with the horizon).

The turbine of the present invention can be used for generating mechanical energy, e.g., electricity, and in many other areas contemplated by those having ordinary skill in the art, whether disclosed or not. For example, the turbine of the present invention can also be used to charge storage batteries should the user decide to generate electricity to a residence, or some other facility.

The foregoing also describes only some embodiments of the present invention and modifications, obvious to those skilled in the art can be made thereto without departing from the present invention. For example, either clockwise or anticlockwise rotation of the rotor is contemplated. Similarly, the extension to three, four or more blades mounted on a plurality of shafts is readily apparent.

TV should, therefore, be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

What is claimed is:

1. A vertical-wind axis turbine comprising:
   a frame fixedly extending in a substantially vertical orientation;
   a power train mounted to the frame;
   an electrical generator attached below the power train;
   a rotor shaft rotably mounted to the frame extending in a substantially vertical orientation;
   a rotor blade assembly attached to the shaft comprising an outer skin defining a blade surface having a leading edge and a trailing edge with a cord extending from the leading edge to the trailing edge, each side of the blade surface having a convex portion and a concave portion wherein the concave portion of one of the sides crosses the cord at a single occurrence.

2. The turbine of claim 1, wherein the rotor shaft is in a tubular shape.

3. The turbine of claim 2, wherein the rotor shaft is a hollow metal or metal alloy.

4. The turbine of claim 2, wherein the rotor shaft comprises a plurality of tube sections attached together.

5. The turbine of claim 1, wherein the rotor blade further comprises an inner frame surrounded by the outer skin to define a blade-like structure.

6. The turbine of claim 1, wherein the outer skin of the rotor blade is formed from polyurethane, fiberglass, metal, a metal alloy, wood, or any combination thereof.

7. The turbine of claim 1, wherein end plates are mounted on ends of the rotor blade.

8. The turbine of claim 7, wherein the end plate is substantially symmetrical about a longitudinal axis and a lateral axis.

9. The turbine of claim 1, wherein the cord of the blade is about 66 inches long from the leading edge to the trailing edge.

10. The turbine of claim 1, wherein the blade has an upper camber and a lower camber with a maximum separation between the cambers of about 28 inches.

11. The turbine of claim 7, wherein each end plate has a cord of about 96 inches.

12. The turbine of claim 7, wherein each end plate has a cord that is offset from the cord of the blade.

13. The turbine of claim 1, wherein the blade has a mean camber line that is generally S-shaped.

14. The turbine of claim 1, wherein the rotor shaft has a longitudinal axis and the mean camber line intersects with said longitudinal axis.

15. An apparatus comprising:
    a rotor shaft; and,
    a rotor blade assembly attached to the rotor shaft comprising an outer skin defining a blade surface having a leading edge and a trailing edge with a cord extending from the leading edge to the trailing edge, each side of the blade surface having a convex portion and a concave portion wherein the concave portion of one of the sides crosses the cord and the mean camber line is generally S-shaped.

16. The apparatus of claim 15 wherein the concave portion crosses the cord at a single occurrence.

17. The apparatus of claim 15 wherein the rotor blade has a pair of ends with end plates attached thereto.

18. The apparatus of claim 17 wherein each end plate has a cord that is offset from the cord of the blade.

19. The apparatus of claim 15, wherein the rotor shaft has a longitudinal axis and the mean camber line interests with said longitudinal axis.

20. An apparatus comprising:
    a rotor shaft having a longitudinal axis;
    a rotor blade assembly attached to the rotor shaft comprising an outer skin defining a blade surface having a leading edge and a trailing edge with a cord extending from the leading edge to the trailing edge, each side of the blade surface having a convex portion and a concave portion wherein the concave portion of one of the sides crosses the cord at a single occurrence and the mean camber line is generally S-shaped and intersects with the longitudinal axis of the rotor shaft; and,
    wherein the rotor blade has a pair of ends with end plates attached thereto and each end plate has a cord that is offset from the cord of the blade.

* * * * *